United States Patent [19]

Yamashita et al.

[11] Patent Number: 4,684,224
[45] Date of Patent: Aug. 4, 1987

[54] FIELD VIEW DIRECTION CHANGING OPTICAL SYSTEM

[75] Inventors: Nobuo Yamashita; Susumu Takahashi, both of Hachiouji, Japan

[73] Assignee: Olympus Optical Co., Ltd., Tokyo, Japan

[21] Appl. No.: 550,206

[22] Filed: Nov. 9, 1983

[30] Foreign Application Priority Data

Nov. 10, 1982 [JP] Japan ................. 57-197401

[51] Int. Cl.[4] ................. G02B 17/00; G02B 23/26
[52] U.S. Cl. ................. 350/445; 350/96.26; 350/447
[58] Field of Search ............. 350/96.26, 413, 445, 350/447

[56] References Cited

U.S. PATENT DOCUMENTS

| | | | |
|---|---|---|---|
| 1,695,672 | 12/1928 | Wappler | 350/287 X |
| 1,703,215 | 2/1929 | Wappler | 350/445 X |
| 2,750,677 | 6/1956 | Wirth | 350/445 X |
| 4,138,192 | 2/1979 | Yamasita | 350/447 X |

FOREIGN PATENT DOCUMENTS 5091333 12/1973 Japan.
1422159 1/1976 United Kingdom ............ 350/445

Primary Examiner—Bruce Y. Arnold
Assistant Examiner—Scott J. Sugarman
Attorney, Agent, or Firm—Cushman, Darby & Cushman

[57] ABSTRACT

A field of view direction changing optical system comprising an incident face intersecting at right angles with the optical axis of the light from the observation field of view forming an angle $\theta$ with respect to an optical axis of an image transmitting optical system, a first reflecting face forming an angle $\theta/2$ with respect to said incident face and a prism having a second reflecting face parallel to said incident face or coincident with it, in order to prevent the occurrence of astigmatism and to enable that the positioning adjustment at assemblage can be done easily. On the second reflecting face a parallel plane glass is secured and on said parallel plane glass a plano-concave lens aligned to said optical axis forming an angle $\theta$ with respect to the optical axis of the image transmitting optical axis may be secured.

3 Claims, 6 Drawing Figures

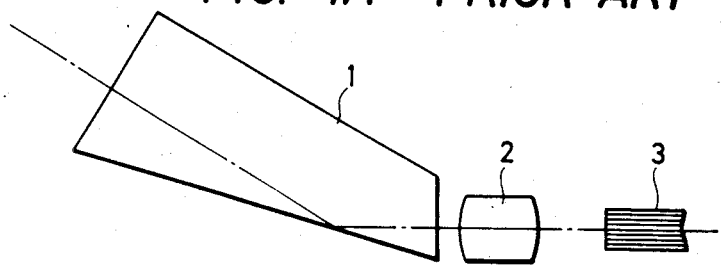
FIG. 1A PRIOR ART
FIG. 1B PRIOR ART
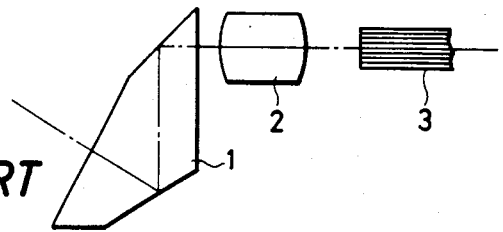
FIG. 2 PRIOR ART
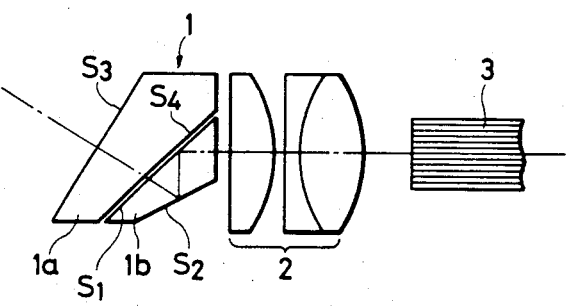
FIG. 3
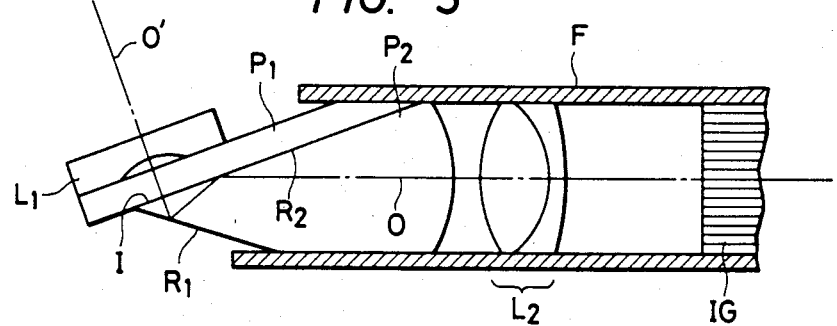

FIELD VIEW DIRECTION CHANGING OPTICAL SYSTEM

BACKGROUND OF THE INVENTION (a) Field of the invention

The present invention relates to a field of view direction changing optical system to be used with an optical apparatus such as an endoscope, a periscope and the like.

(b) Description of the prior art

An optical apparatus having a long and slender image transmitting optical system such as of an endoscope, a periscope and the like cannot be made larger than a certain degree because the outer diameter of the apparatus is generally limited, specially the outer diameter of the endoscope is 2 cm at most even with a large one and is 2~3 mm with a slender one to limit the diameter to be extremely thin. And, in such an optical apparatus, a prism is generally used for the field of view direction change necessary to effect a slant view, a side view and the like, but the field of view direction change under the circumstances in which the outer diameter is limited as mentioned above is accompanied with considerable difficulties. In the case of the side view, for example, it is comparatively easy because it can be realized only by arranging a right angle prism in front of an objective lens, but in the case of the slant view it was absolutely impossible to be assembled in an endoscope and the like because a prism 1 positioned in front of an objective lens 2 is necessarily very large as shown in FIG. 1A or FIG. 1B. By the way, 3 is an image guide.

Therefore, in order to settle this problem, the endoscope, for example, disclosed in Japanese Patent Application Laid-Open No. 50-91333 is so formed that the prism 1 is divided as shown in FIG. 2 into a first prism 1a and a second prism 1b of which an incident face $S_1$ is used as a total reflection face and the light entered from the incident face $S_1$ into the second prism 1b is again reflected on the incident face $S_1$ after having been reflected on the reflecting face $S_2$ so as to advance to an image transmitting optical system 3. However, such a field of view direction changing optical system has a defect such that the image deteriorates due to the occurrence of astigmatism because the luminous flux necessarily has to pass obliquely through the air space between the first prism 1a and second prism 1b while it has an advantage such that the prism portion can be made small. Further, as the exit face $S_4$ is inclined with respect to the incident face $S_3$ of the first prism 1a, the assemblage is very troublesome because a high accuracy is requested in an adjustment to eliminate an aberration of the relative position between the first prism 1a and the second prism 1b or the position, angle and the like to fix the both prisms 1a and 1b in the main body of an endoscope. That is to say, as well known, it is because inclinations and eccentricities of respective elements in the optical system generate the deterioration of astigmatism.

SUMMARY OF THE INVENTION

The primary object of the present invention is, in view of the above mentioned circumstances, to provide a field of view direction changing optical system which can prevent the occurrence of astigmatism and the position adjustment of optical elements at assemblage is easy.

This object, according to the present invention, is attained by disposing an incident face intersecting at right angles with an optical axis of the light from the observation field forming an angle $\theta$ with the optical axis of the image transmitting optical system, a first reflecting face forming an angle $\theta/2$ with respect to said incident face and a second reflecting face parallel to or coincident with said incident face.

According to a preferable formation of the present invention, when the refractive index of the incident side of the second reflecting face is denoted as $n_1$ and the refractive index of the side opposite to said incident side is denoted as $n_2$, the field of view direction changing optical system is so formed as to satisfy the condition that $n_1/n_2 < \sin\theta$.

According to another preferable formation of the present invention, the field of view direction changing optical system consists of a prism having a first reflecting face and second reflecting face, a parallel plane glass fixed on the second reflecting face and a plano-concave lens fixed on the surface of the parallel plane glass aligned with the optical axis of the light from the observation field of view. The incident face and the second reflecting face of the prism may be within a same plane and also be so formed as two faces being at the different height positions.

BRIEF DESCRIPTION OF THE DRAWINGS

FIGS. 1A, 1B and FIG. 2 are views respectively showing a conventional field of view direction changing optical system;

FIG. 3 is a view showing an embodiment of the field of view direction changing optical system according to the present invention;

DESCRIPTION OF THE PREFERRED EMBODIMENTS

Figure 4:
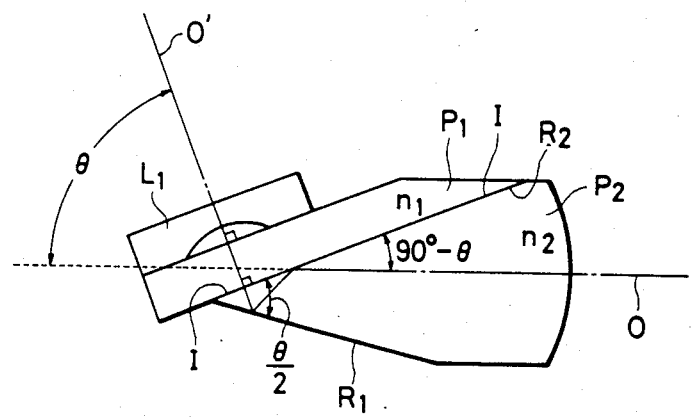
FIG. 4 is an enlarged view of the main portion of the above embodiment.

First, referring to an embodiment shown in FIG. 3 and FIG. 4, the reference symbol $L_1$ is a plano-concave lens having an incident face intersecting at right angles with the optical axis O' of the light from the observation field of view forming an angle $\theta$ (an oblique view angle) with the optical axis O of the image transmitting optical system, $P_1$ is a parallel plane glass plate having incident and exit faces intersecting at right angles with the optical axis O', $P_2$ is a field of view direction changing prism having an incident face I intersecting at right angles with the optical axis O', a first reflecting face $R_1$ forming an angle $\theta/2$ with respect to said incident face I and a second reflecting face $R_2$ coincident with said incident face I and supported by a lens frame F, $L_2$ is a positive-negative cemented positive lens supported by the lens frame F. These are arranged in order along the optical axis O' and O to form an objective optical system. And, among the above optical elements, the plano-concave lens $L_1$ is fixed on the surface of the parallel plane glass $P_1$ and the parallel plane glass $P_1$ is fixed on the incident face I of the field of view direction changing prism $P_2$ and this plano-concave lens $L_1$, the field of view direction changing prism $P_2$ and the cemented positive lens $L_2$ form so-called retro focus type objective lens. However, the plane concave lens $L_1$ may be omitted when it is specifically needed to be wide angle. Further, the parallel plane glass plate $P_1$ is disposed to hold the plano-concave lens $L_1$ by being adhered on the incident face thereof. However, it may be omitted if another adequate method to hold the plane concave lens $L_1$ exists. The reference symbol IG is an image guide.

As the field of view direction changing optical system according to the present invention is so formed as mentioned above, the light issued from an object not illustrated enters into the field of view direction changing optical system $P_2$ from the incident face I after having passed in order the plano concave lens $L_1$ and the parallel plane glass plate $P_1$, reflects at the second reflecting face $R_2$ after having nextly reflected at the first reflecting face $R_1$ and advances to the cemented positive lens $L_2$. Here, as the angle formed by the first reflecting face $R_1$ and the second reflecting face $R_2$ is $\theta/2$, the angle formed by the light reflected at the second reflecting face $R_2$ and the second reflecting face $R_2$ is $90° - \theta$ and, as a result, the advance direction of said light coincides with the optical axis O of the image transmitting optical system (FIG. 4). By the way, in this case, when the refracting index of the incident side of the second reflecting face $R_2$ or the field of view direction changing optical system is denoted as $n_2$ and the refracting index of the side opposite to said incident side or the outer portion of the second reflecting face $R_2$ is denoted as $n_1$, the reflection on the second reflecting face $R_2$ will be a total reflection by selecting the material of each member so as to satisfy the condition that $n_1/n_2 < \sin \theta$. This formation is desirable in that, as the total reflection has higher reflectivity than that of the mirror face reflection, the brightness of the image increases, but the oblique view angle $\theta$ will be limited within a certain range. For example, when the outer portion of the second reflecting face $R_2$ is an air stratum or when a gap is disposed between the field of view direction changing prism $P_2$ and parallel plane glass plate $P_1$, as $n_1 = 1$ and at the same time it is possible to use such a degree of $n_2 = 1.4 \sim 2.0$ in case the material of the prism $P_2$ is predetermined to be a glass, the oblique view possible range will be $30° < \theta < 90°$. Further, even when the parallel plane glass plate $P_1$ is sticked on the field of view direction changing prism $P_2$, in case the material of the both is predetermined to be a glass, the oblique view possible range will be $45° < \theta < 90°$. In this mode, the oblique view angle $\theta$ will be limited within a certain range, but it makes no problem in practice since the angle formed by the principal ray of the maximum angle of view and the optical axis is able to be made small in the prism by forming the objective lens in a retro focus type.

Further, the first reflecting face $R_1$ is generally so made as to be a mirror face reflection, but it is preferable to be a total reflection when it is possible to make it a total reflection because it shows the maximum reflectivity.

In this way, the field of view direction change is effected by the present optical system, but no astigmatism occurs because the present optical system achieves the field of view direction change by foundamentally using a single field of view direction changing prism $P_2$ and at the same time makes the light enter vertically on the incident face I of said prism $P_2$. And, even when the glass plate $P_1$ is used to make the holding of the plano-concave lens $L_1$ easy or for the protection in case of using a total reflection at the second reflecting face $R_2$, this is so formed as to be a parallel plane glass plate that the relative positioning of the glass plate $P_1$ and the prism $P_2$ is easy. That is to say, when the prism portion is divided into two members and these do not intersect at right angles with respect to the optical axis of the light from the observation field of view, the astigmatism deteriorates only by relatively rotating these two prism members, but there is no such a danger in the present optical system.

Figure 5:
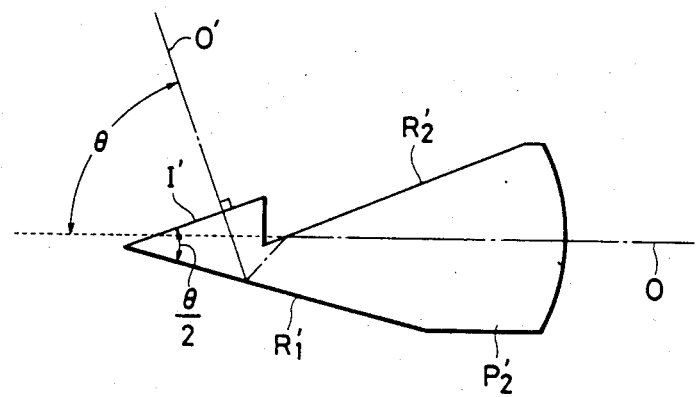
FIG. 5 is an enlarged view of the main portion of another embodiment.

By the way, different from the above mentioned embodiment, as shown in FIG. 5, the incident face $I'$ and the first reflecting face $R_1'$ may form an angle $\theta/2$ and the single field of view direction changing prism $P_2'$ of which the second reflecting face $R_2'$ is parallel to the incident face $I'$ may be so arranged that the incident face $I'$ and the oblique view optical axis $O'$ intersects at right angles. In this case, the relative positioning of when the prism portion is formed with two prism members is utterly unnecessary.

We claim:

1. A field of view direction changing optical system comprising, for an observation field of view having an optical axis, an incident face of the system intersecting at a right angle with the optical axis of the light from the observation field of view, an image transmitting optical system having an optical axis intersecting the optical axis of the light from the observation field to view at an angle $\theta$, a first reflecting face forming an angle $\theta/2$ with respect to said incident face and a second reflecting face disposed on the same face as said incident face and satisfying the condition $n_1/n_2 < \sin \theta$ when the refractive index of the light incident side with respect to said second reflecting faces is denoted as $n_1$ and the refractive index of the side opposite to said light incident side is denoted as $n_2$.

2. A field of view direction changing optical system according to claim 1, wherein a light transmitting parallel plane plate is fixed on the incident side of said incident face and a piano-concave lens having a concave face facing said plate is fixed on said plate.

3. A field of view direction changing optical system comprising an incident face intersecting at a right angle with the optical axis of the light from an observation field of view forming an angle $\theta$ with respect to an optical axis of an image transmitting optical system, a first reflecting face forming an angle $\theta/2$ with respect to said incident face and a second reflecting face being at a position relative to said optical axis of the image transmitting system different from that of said incident face and parallel to said incident face, and satisfying the condition $n_1/n_2 < \sin \theta$ when the refractive index of the light incident side with respect to said second reflecting faces is denoted as $n_1$ and the refractive index of the side opposite to said light incident side in denoted as $n_2$.

* * * * *